United States Patent
Poulose et al.

(10) Patent No.: US 12,163,490 B2
(45) Date of Patent: *Dec. 10, 2024

(54) TURBOCHARGED COMPRESSOR

(71) Applicant: Ingersoll-Rand Industrial U.S., Inc., Davidson, NC (US)

(72) Inventors: Vineeth Poulose, Bengaluru (IN); Sajesh Poolathody, Malappuram (IN); Sujin Abdul Salam, Bengaluru (IN)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/507,451

(22) Filed: Nov. 13, 2023

(65) Prior Publication Data
US 2024/0077048 A1 Mar. 7, 2024

Related U.S. Application Data

(63) Continuation of application No. 18/149,309, filed on Jan. 3, 2023, now Pat. No. 11,852,100, which is a continuation of application No. 17/523,521, filed on Nov. 10, 2021, now Pat. No. 11,542,892.

(51) Int. Cl.
*F02K 3/08* (2006.01)
*F01N 5/02* (2006.01)

(52) U.S. Cl.
CPC .............. *F02K 3/08* (2013.01); *F01N 5/02* (2013.01); *F05D 2220/40* (2013.01)

(58) Field of Classification Search
CPC ..... F02K 3/02; F02G 5/02; F02G 5/04; F02G 2260/00; F02G 2262/00; F05D 2220/40; F01N 5/02; F01N 3/0205; F01N 2240/02; Y02A 30/274; Y02T 10/12; Y02T 10/40
See application file for complete search history.

(56) References Cited

U.S. PATENT DOCUMENTS

| | | |
|---|---|---|
| 6,571,548 B1 | 6/2003 | Bronicki et al. |
| 7,174,716 B2 | 2/2007 | Brasz et al. |
| 9,726,425 B2 | 8/2017 | Kevenaar et al. |
| 10,161,271 B2 | 12/2018 | Collins et al. |
| 10,329,959 B2 | 6/2019 | Davidian et al. |
| 11,542,892 B1 | 1/2023 | Poulose et al. |

(Continued)

*Primary Examiner* — Dapinder Singh
(74) *Attorney, Agent, or Firm* — Kevin E. West; Advent, LLP

(57) ABSTRACT

A turbocharged compressor system using an Organic Rankine Cycle system to recover waste heat from a compression process. The Organic Rankine Cycle system circulates an organic fluid through an evaporator, where the organic fluid vaporizes and is expanded in a turbine section of a turbocharger to drive a compressor section of the turbocharger. The organic fluid vapor is condensed in a condenser and is pumped to the evaporator once again for recirculation. The compressor section of the turbocharger pre-compresses a working fluid before entering an airend in a compression system. As the working fluid exits the airend, it may be delivered to the evaporator, where the waste heat from the working fluid evaporates the organic fluid flowing in the Organic Rankine Cycle system. The working fluid may also be circulated between intercoolers in multi-stage compressor systems.

20 Claims, 3 Drawing Sheets

(56) References Cited

U.S. PATENT DOCUMENTS

| | | | |
|---|---|---|---|
| 2011/0132032 A1* | 6/2011 | Gatti | F25J 1/0242 |
| | | | 165/4 |
| 2014/0144136 A1* | 5/2014 | Versteyhe | F02B 37/10 |
| | | | 60/605.1 |
| 2014/0165562 A1 | 6/2014 | Nagai et al. | |
| 2018/0051652 A1 | 2/2018 | Filippone | |
| 2019/0234343 A1 | 8/2019 | Park et al. | |

* cited by examiner

TURBOCHARGED COMPRESSOR

CROSS-REFERENCE TO RELATED APPLICATIONS

The present application is a continuation of U.S. patent application Ser. No. 18/149,309, filed Jan. 3, 2023, and titled "TURBOCHARGED COMPRESSOR", which is a continuation of U.S. patent application Ser. No. 17/523,521, filed Nov. 10, 2021, and titled "TURBOCHARGED COMPRESSOR". U.S. patent application Ser. No. 18/149,309 and U.S. patent application Ser. No. 17/523,521 are herein incorporated by reference in their entireties.

BACKGROUND

Compressors are mechanical devices that increase the pressure of a fluid (e.g., air) by reducing the volume of said fluid. The temperature of the fluid increases as it is compressed.

DRAWINGS

The Detailed Description is described with reference to the accompanying figures. The use of the same reference numbers in different instances in the description and the figures may indicate similar or identical items.

DETAILED DESCRIPTION

Figure 1:
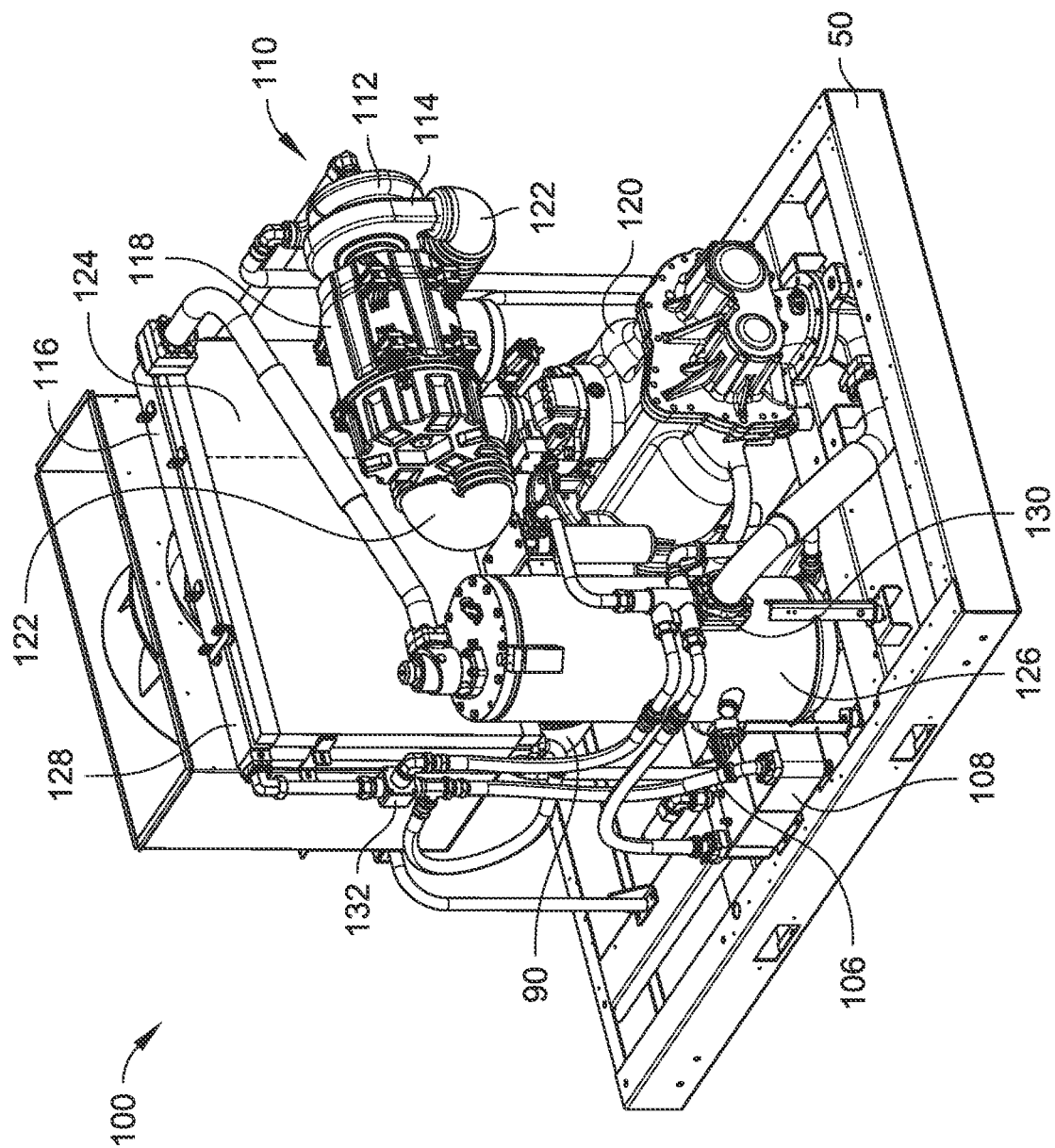
FIG. 1 is a perspective view illustrating a turbocharged fluid compressor system having a waste recovery system in accordance with example embodiments of the present disclosure.

For the purposes of promoting an understanding of the principles of the subject matter, reference will now be made to the embodiments illustrated in the drawings and specific language will be used to describe the same. It will nevertheless be understood that no limitation of the scope of the subject matter is thereby intended. Any alterations and further modifications in the described embodiments, and any further applications of the principles of the subject matter as described herein are contemplated as would normally occur to one skilled in the art to which the subject matter relates.
Overview Fluid compressor systems are widely used in a variety of industries such as in construction, manufacturing, agriculture, energy production, etc. As fluid compressors compress a working fluid, heat is produced as a result of the pressure increase in the working fluid. This heat is not only a waste of energy but also a waste of money for the users. Some systems use a portion of this heat waste in energy recovery systems that deliver hot water as a byproduct, but not all compressor users have a need for hot water.

Accordingly, the present disclosure is directed to a turbocharged fluid compressor system having a waste heat recovery system that increases the efficiency of a fluid compressor system by recovering heat produced in the compression process and using it to power a turbine section in a turbocharger. The turbocharged fluid compressor system can be used with any type of fluid compression device and should not be limited to the illustrative fluid compressor system shown in any of the accompanying figures. The term "fluid" should be understood to include any compressible fluid medium that can be used in the fluid compressor system as disclosed herein. It should be understood that air is a typical working fluid, but different fluids or mixtures of fluid constituents can be used and remain within the teaching of the present disclosure. Therefore, terms such as fluid, air, compressible gas, etc. can be used interchangeably in the present disclosure. For example, in some embodiments it is contemplated that ambient air, a hydrocarbon gaseous fuel including natural gas or propane, or inert gases including nitrogen or argon may be used as a primary working fluid.

The waste heat recovery system may comprise an organic Rankine cycle (ORC) system operating with an organic compound. One benefit of using an organic compound in a Rankine cycle system is that it allows the recovery of heat from relatively low temperature sources such as in the case of industrial waste heat. It should be understood that the terms "organic compound" and "organic fluid" are used interchangeably herein to describe an organic, high molecular mass fluid, having a boiling point at a lower temperature than the boiling temperature of water. Although an ORC system is discussed herein, it should be understood that the working fluid for the Rankine Cycle in the waste heat recovery system may be water, or another fluid (e.g., having a low molecular mass) not classified as an organic compound. The working fluid of the Rankine Cycle may have a boiling point at a lower, higher, or equal to the boiling temperature of water.

The ORC system includes a pump to move the organic fluid within the system. At least one evaporator evaporates the organic fluid in the system, which is then directed to the turbocharger. In the ORC system described, the turbine section of the turbocharger acts as an expander device to expand the organic fluid vapor and drive a compressor section of the turbocharger. After the organic fluid vapor exits the turbocharger, it is directed to a condenser. The condenser condenses the organic fluid vapor, which is pumped by a pump back into the at least one evaporator to restart the cycle.

The compressor section of the turbocharger pre-compresses a working fluid (e.g., ambient air) before entering the fluid compressor system. The working fluid may flow through a filter device before entering the compressor section of the turbocharger. The fluid compressor system may include a positive displacement compressor such as a rotary screw compressor or a reciprocating compressor, or a dynamic compressor such as a centrifugal compressor or an axial compressor. The fluid compressor system can include a compressor with multi-stage compression or a compressor with single stage compression. Other forms and configurations of compression devices are also contemplated herein.

As the working fluid is compressed in the fluid compressor system, the temperature of the working fluid increases. In example embodiments, the hot working fluid may be directed to the at least one evaporator of the ORC system, where the waste heat of the working fluid is used to evaporate the organic fluid of the ORC system that powers the compressor section of the turbocharger. By using a pre-compressed fluid at an inlet of the fluid compressor system, the power consumption of the fluid compressor system improves. Thus, the efficiency of the fluid compressor system (e.g., the compressor section of the turbocharger)

is improved by recovering a portion of the waste heat produced as a by-product of the working fluid's pressure increase. Additional benefits include but are not limited to a lower pressure ratio across an airend's inlet and outlet, which results in reduced internal leaking, and lower cooling loads entering the fluid compressor's cooling sections, both of which further improve the efficiency of the fluid compressor system.

DETAILED DESCRIPTION OF EXAMPLE EMBODIMENTS

Figure 2:
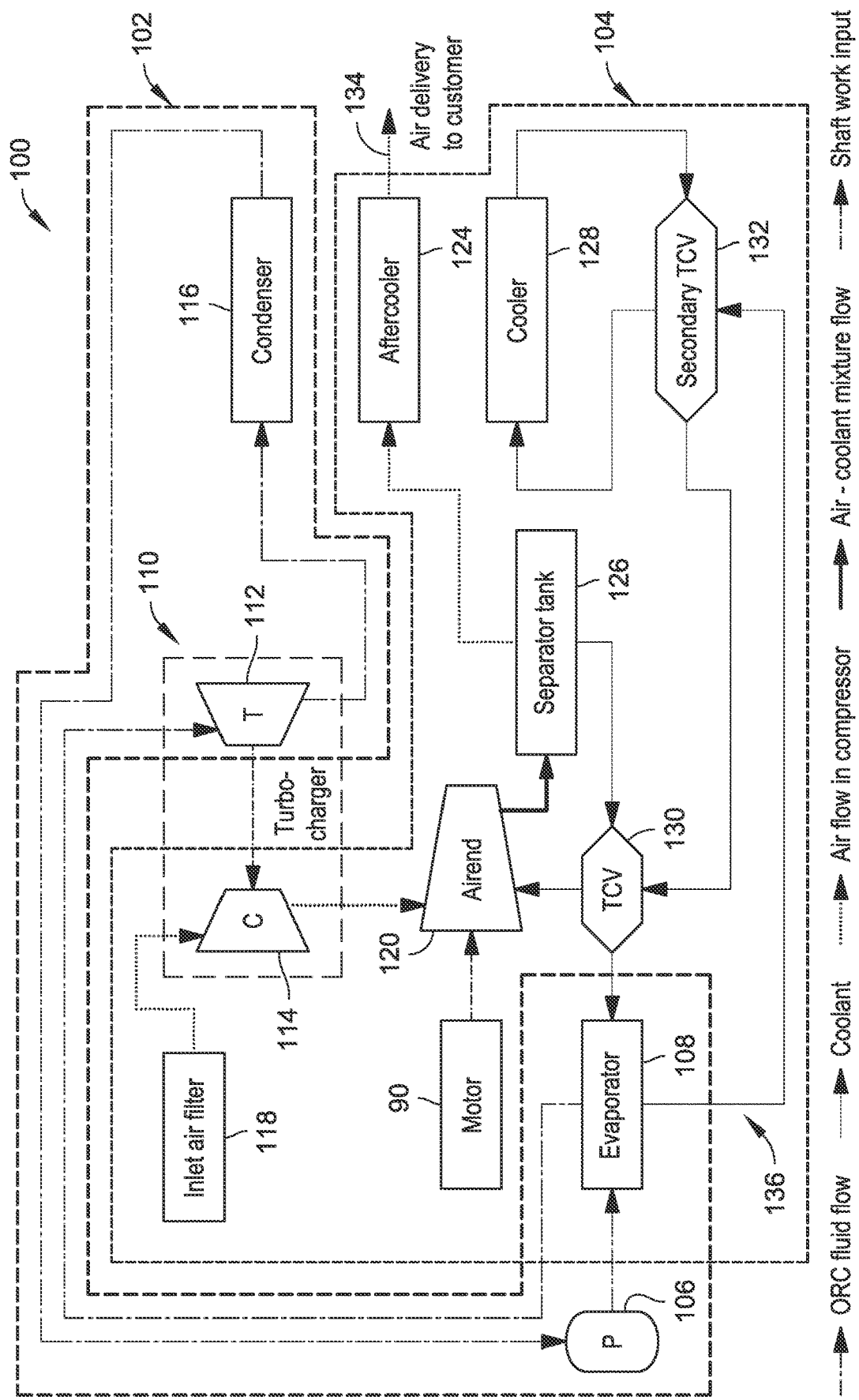
FIG. 2 is a schematic view of a turbocharged fluid compressor system, such as the turbocharged fluid compressor system shown in FIG. 1, including a contact-cooled compressor having a coolant circulation system.
Figure 3:
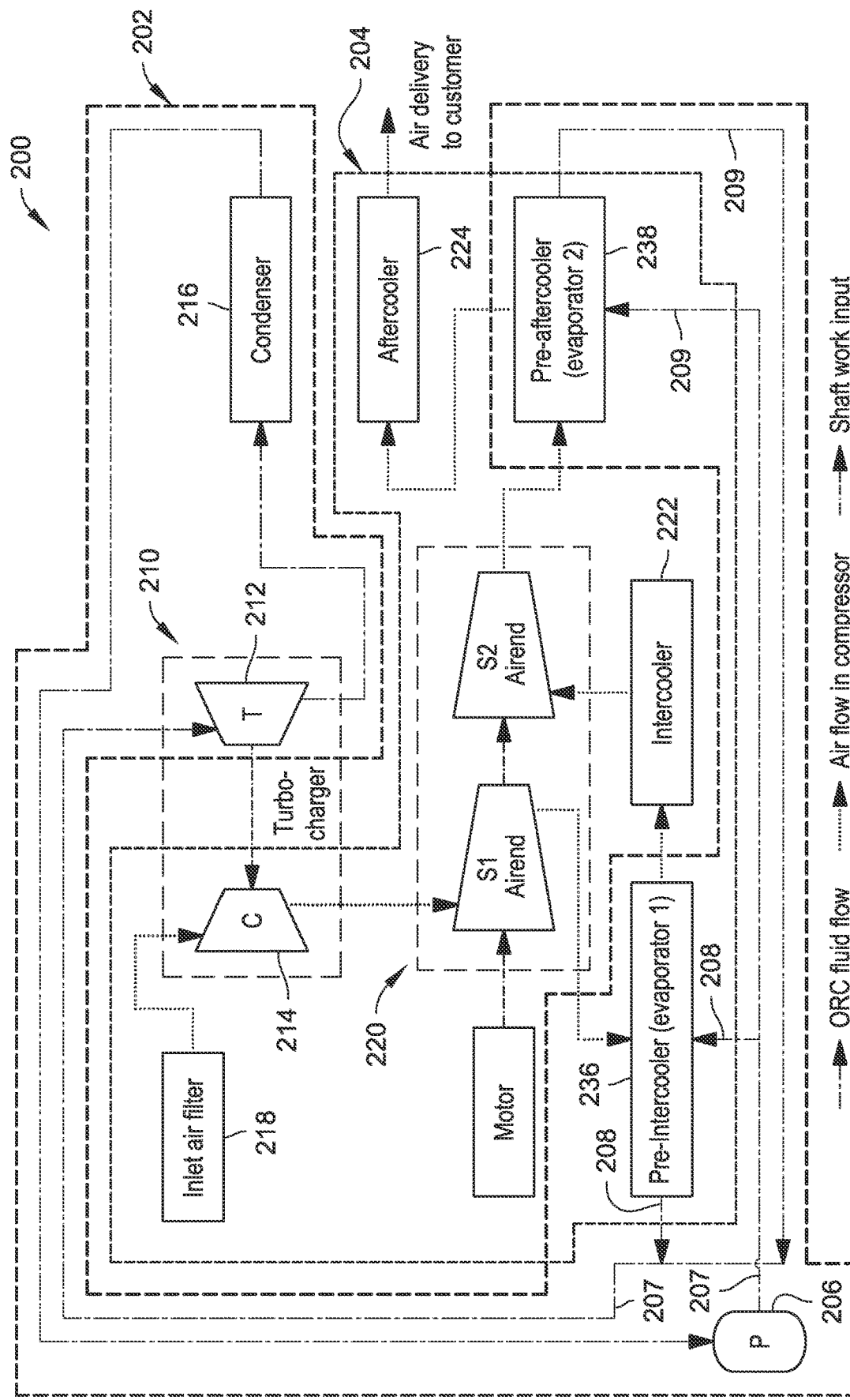
FIG. 3 is a schematic view of a turbocharged fluid compressor system including a coolant-free compressor having a first compression stage and a second compression stage in accordance with example embodiments of the present disclosure

Referring generally to FIGS. 1 through 3, turbocharged fluid compressor systems are described. Turbocharged fluid compressor system 100 includes a waste heat recovery system 102 and a fluid compressor system 104. Waste heat recovery system 102 includes a turbocharger 110 having a turbine section 112 and a compressor section 114. Waste heat recovery system 102 further includes a pump 106, at least one evaporator 108, and a condenser 116.

Pump 106 moves a waste heat recovery fluid through the waste heat recovery system through the at least one evaporator 108, where it evaporates into waste heat recovery vapor. The waste heat recovery vapor enters the turbine section 112 of the turbocharger 110. The turbine section 112 extracts energy from the waste heat recovery vapor and converts it into kinetic energy, driving the compressor section 114 of the turbocharger 110. As the waste heat recovery vapor exits the turbocharger 110, it is directed to the condenser 116, where it condenses.

As shown, the fluid compressor system 104 includes an inlet air filter 118, a primary motive source 90, an airend 120, and an after cooler 124. Inlet air filter 118 filters the incoming working fluid (e.g., ambient air) prior to entering the pre-compression stage at the compression section 114 of the turbocharger 110. As the working fluid is pre-compressed, its temperature increases. A heat dissipating device such as finned tube 122 shown may be installed between the pre-compression stage at compression section 114 and airend 120. Finned tube 122 enables cooling of the working fluid and minimizes a drop in pressure. It should be understood that other types of heat dissipating devices for lowering the temperature of the working fluid without reducing the pressure accumulated during the pre-compression stage may be used instead. For example, the heat dissipating device may be a tube with integral external fins, a tube with integral internal fins, a tube with a static mixer insert, etc.

The working fluid is further compressed in the airend 120. Primary motive source 90 is operable for driving the airend 120 via a drive shaft. Primary motive source may be an electric motor, an internal combustion engine, a fluid-driven turbine, or the like. Airend 120 increases the pressure of the working fluid, which also increases the temperature of the working fluid as a result. This hot working fluid is directed to the at least one evaporator 108, where the waste heat is used to evaporate the waste heat recovery fluid flowing through the waste heat recovery system 102. Upon leaving the at least one evaporator 108, the pre-cooled working fluid flows into an after cooler 124, where its temperature is further reduced prior to delivery.

With respect to FIG. 1, an example embodiment of a turbocharged fluid compression system 100 is shown. A structural base 50 can be configured to support at least portions of the turbocharged fluid compression system 100. In example embodiments, the turbocharged fluid compression system 100 is not supported by structural base 50, with the different components forming the turbocharged fluid compression system 100 being installed separately and being connected through the respective piping. An inlet ORC fluid manifold and an outlet ORC fluid manifold (not shown) may supply the ORC system with the ORC fluid needed.

FIG. 2 is a schematic of the example embodiment of the turbocharged fluid compression system 100 shown in FIG. 1. The fluid compressor system 104 includes a contact-cooled airend 120 having a coolant circulation system 136. For example, a coolant circulated by the coolant circulation system 136 used in the turbocharged fluid compressor system 100 may be oil, water, or any other coolant used in contact-cooled compressor systems. In the contact-cooled airend 120, coolant is injected into compression cavities within the airend to aid cooling of the working fluid. A discharge stream of pressurized working fluid and coolant mixture is discharged from the contact-cooled airend 120 at a high temperature. The discharge stream is directed to a separator tank 126, where the coolant is separated from the working fluid. The coolant-free working fluid is cooled at the after cooler 124 located downstream from the separator tank 126 prior to exiting through an outlet 134 towards an end use machine, a compressed fluid system, or a storage tank (not shown).

After being separated from the working fluid and discharged from the separator tank 126, the hot coolant is directed to a primary temperature control valve (TCV) 130. The primary TCV 130 is further connected to the contact-cooled airend 120, the at least one evaporator 108, and a secondary TCV 132. The primary TCV 130 can control and selectably direct the coolant flow in the coolant circulation system towards the at least one evaporator 108 or the airend 120 based on the desired temperature of the coolant flow. The primary TCV 130 directs the hot coolant discharged from the separator tank 126 to the at least one evaporator 108, where the organic fluid absorbs the waste heat in the coolant. The at least one evaporator 108 may be a brazed plate heat exchanger, but any other type of heat exchanger may be used to absorb heat from the hot coolant and evaporate the organic fluid according to example embodiments of the present disclosure. In example embodiments, the turbocharged fluid compressor system may have a different number of TCVs and is not limited to having a primary and a secondary TCV. For example, a turbocharged fluid compressor system may have one TCV or may not include any TCVs.

As the cooled coolant exits the at least one evaporator 108, it flows into the secondary TCV 132. The secondary TCV 132 selectably directs the cooled coolant to a cooler 128 for further cooling or back into the airend 120 through the primary TCV 130, depending on the desired temperature of the coolant prior to entering the airend 120. Since the majority of the hot coolant's heat is absorbed in the at least one evaporator 108, a smaller cooler 128 may be used in place of larger coolers in typical contact-cooled compressor systems. The space saved from the use of the smaller cooler 128 may be used to accommodate other elements of the turbocharged fluid compressor system 100 (e.g., the condenser 116) without significantly increasing the size of the turbocharged fluid compressor system 100 compared to other fluid compressor systems.

Example embodiments of the turbocharged fluid compressor system 100 may also include a heat waste recovery system 102 that further recovers waste heat from the compressed working fluid prior to entering the aftercooler 124, and not only recovers the waste heat from the coolant ejected from the airend 120. In example embodiments, the at least one evaporator 108 recovers the waste heat from the discharge stream containing the working fluid and coolant mixture prior to entering the separator tank 126.

The turbocharged fluid compression system 100 may include a controller (not shown) operable for controlling the primary motive source 90, pump 106, valves and fluid control mechanisms (e.g., the primary and secondary TCVs), the waste heat recovery system 102 and the fluid compressor system 104.

When the turbocharged fluid compressor system 100 is switched on, the controller starts the primary motive source 90, which drives the airend 120. The airend 120 starts delivering the pressurized stream of working fluid and coolant. As the discharge stream of pressurized coolant and working fluid discharged by the airend 120 builds up in the separator tank 126, coolant separates from the working fluid in the separator tank. As the temperature of the working fluid increase, the coolant's temperature increases. The primary TCV 130 selectably lets the hot coolant flow into the cooler 128. Depending on selected temperature parameters, as the coolant reaches a specific temperature, the pump 106 in the ORC system 102 starts pumping organic fluid. Preferably, a coolant temperature threshold at which the pump 106 starts pumping organic fluid is higher than the coolant temperature threshold at which the primary TCV sends the separated coolant into the cooler 128. While the coolant temperature does not reach the coolant temperature threshold required to start the ORC system 102, the coolant is cooled by the cooler 128 prior to recirculating into the airend 120.

In example embodiments, the contact-cooled airend may include more than one airend stage. An intercooler may be disposed between each of the airend stages to cool the pressurized working fluid and coolant mixture before entering the next airend stage to be further pressurized. The turbocharged fluid compression system 100 is not limited to having only one airend 120.

FIG. 3 is a schematic of an example embodiment of the turbocharged fluid compressor system 200, where a coolant-free fluid compressor system 204 includes a coolant-free airend 220. Coolant-free airend 220 includes a first airend stage S1, a second airend stage S2, an intercooler 222 and an aftercooler 224. Other example embodiments of the coolant-free compressor system 204 may employ a different number of airend stages. Turbocharged fluid compressor system 200 includes two evaporators: a first evaporator 236, located downstream from the first airend stage S1, acting as a pre-intercooler, and a second evaporator 238, located downstream from the second airend stage S2, acting as a pre-aftercooler.

The organic fluid in ORC system 202 is moved by pump 206. An organic fluid flow stream 207 is then split into a first flow stream 208 and a second flow stream 209. The first flow stream 208 passes into the first evaporator 236, where the organic fluid is evaporated. After splitting from the first flow stream 208, the second flow stream 209 is directed to the second evaporator 238, where the organic fluid is evaporated. First flow stream 208 and second flow stream 209 merge back together into the same organic fluid flow stream 207 upstream of the turbine section 212 of turbocharger 210. The turbine section 212 extracts the energy from the organic fluid vapor and converts it into kinetic energy, driving the compressor section 214 of the turbocharger 210.

The organic fluid is delivered from the turbine section 212 of the turbocharger 210 into condenser 216, where it condenses. The organic fluid is pumped back by pump 206, and splits prior to entering first evaporator 236 and second evaporator 238, where it absorbs the waste heat from the working fluid as it exits the first compression stage S1 and second compression stage S2 respectively.

The working fluid is pre-compressed by compressor section 214 of turbocharger 210 prior to entering the first airend stage S1 of coolant-free airend 220. As the pressure of the working fluid is increased, its temperature increases. Upon leaving first airend stage S1, the working fluid enters the first evaporator 236. The organic fluid in first evaporator 236 absorbs the waste heat from the working fluid, evaporating as a result. The pre-cooled working fluid then flows into intercooler 222, where its temperature is further decreased before entering second airend stage S2 of coolant-free airend 220. The working fluid is compressed further, increasing in temperature once again. The compressed working fluid flows into the second evaporator 238 acting as a pre-aftercooler. The organic fluid in second evaporator 236 absorbs the waste heat from the working fluid, evaporating as a result. The pre-cooled working fluid then flows into aftercooler 224, where its temperature is further decreased prior to exiting the turbocharged fluid compressor system 200 for delivery. As waste heat is produced in relatively equal amounts in first and second airend stages S1 and S2, it is possible to have first evaporator 236 and second evaporator 238 working in parallel, evaporating the organic fluid flowing through the ORC system 202.

Turbocharged fluid compressor system 200 may include a coolant/lubricant circulation system where a coolant/lubricant cools and/or lubricates the working fluid without mixing with the working fluid in neither of the airend stages S1 and S2. The coolant/lubricant may absorb heat from the working fluid as it cools/lubricates the working fluid. In example embodiments, the heat absorbed by the coolant/lubricant may be used to preheat the ORC fluid before the ORC fluid enters the pre-intercooler 208 or the pre-aftercooler 238. The hot coolant/lubricant may also be circulated to a third evaporator (not shown) that absorbs the excess heat absorbed by the coolant/lubricant before the coolant/lubricant recirculates.

In example embodiments, the intercooler 222 and the aftercooler 224 may be reduced in size, as the majority of the excess heat in the working fluid is absorbed by the evaporating organic fluid in first and second evaporators. In example embodiments, the first evaporator 236 and the second evaporator 238 may replace intercooler 222 and aftercooler 224, respectively.

The thermal efficiency of the ORC system varies depending on the chosen organic compound used as the waste heat recovery fluid, as different organic compounds have different boiling point temperatures. Examples of organic compounds include but are not limited to HDR-14, isobutane, isopentane, R245fa, SES36, R227ea, among others. For example, in turbocharged fluid compressor system 200, the working fluid compressed by coolant-free airend 220 has a higher discharge temperature than the discharge temperature of the working fluid compressed by contact-cooled airend 120 in turbocharged fluid compressor system 100. The organic fluid used in turbocharged fluid compressor system 100 may be an organic compound (e.g., HDR-14) suitable for evaporating at a lower temperature than the evaporating temperature of the organic compound (e.g., isobutane) used in turbocharged fluid compression system 200. It should be understood that the selection of the waste heat recovery fluid may change based on specific configurations, parameters and requirements of each application.

The turbocharged fluid compressor system may be retrofitted into existing compression systems. The application of the turbocharged fluid compressor system is not limited to fluid compression systems, as any equipment having a compression application with waste heat available from within or outside the compression system may benefit from the increased efficiency as a result of the turbocharged compressor system. Other applications include but are not limited to HVAC systems, refrigeration systems, gas turbines, etc.

While the subject matter has been illustrated and described in detail in the drawings and foregoing description, the same is to be considered as illustrative and not restrictive in character, it being understood that only the preferred embodiments have been shown and described and that all changes and modifications that come within the spirit of the subject matters are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the subject matter, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A method for compressing a working fluid comprising:
evaporating an organic fluid into an organic fluid vapor in at least one evaporator;
receiving the organic fluid vapor in a turbine section of a turbocharger, the turbocharger including the turbine section and a compressor section, the turbine section further expanding the organic fluid vapor to drive the compressor section;
pre-compressing the working fluid in the compressor section of the turbocharger;
condensing the organic fluid vapor in a condenser;
compressing the pre-compressed working fluid in a fluid compressor system; and
recovering heat produced by the fluid compressor system in the at least one evaporator to evaporate the organic fluid.

2. The method of claim 1, further comprising cooling the pre-compressed working fluid in a heat-dissipating device prior to entering the fluid compressor system.

3. The method of claim 1, further comprising compressing the working fluid in a contact-cooled air end of the fluid compressor system and injecting a coolant into the working fluid.

4. The method of claim 3, further comprising separating the coolant injected into the working fluid and cooling the coolant in a cooler prior to recirculation.

5. The method of claim 4, further comprising selectably directing the coolant from a coolant separator tank to the at least one evaporator.

6. The method of claim 5, further comprising evaporating the organic fluid in the at least one evaporator with excess heat from the coolant.

7. The method of claim of claim 1, further comprising directing the working fluid through a coolant-free compressor, wherein the working fluid passes through a first compressor stage, an intercooler, a second compressor stage, and an aftercooler.

8. The method of claim 7, further comprising directing the organic fluid through a first evaporator and a second evaporator.

9. The method of claim 8, further comprising pre-cooling the working fluid in the first evaporator prior to directing the working fluid through the intercooler.

10. The method of claim 8, further comprising pre-cooling the working fluid in the second evaporator prior to directing the working fluid through the aftercooler.

11. A method for compressing a working fluid comprising:
evaporating a waste heat recovery fluid into a waste heat recovery fluid vapor in at least one evaporator;
receiving the waste heat recovery fluid vapor in a turbine section of a turbocharger, the turbocharger including the turbine section and a compressor section, the turbine section further expanding the waste heat recovery fluid vapor to drive the compressor section;
pre-compressing the working fluid in the compressor section of the turbocharger;
condensing the waste heat recovery fluid vapor in a condenser;
compressing the pre-compressed working fluid in a fluid compressor system; and
recovering waste heat produced by the fluid compressor system in the at least one evaporator to evaporate the waste heat recovery fluid.

12. The method of claim 11, further comprising cooling the pre-compressed working fluid in a heat-dissipating device prior to entering the fluid compressor system.

13. The method of claim 12, further comprising compressing the working fluid in a contact-cooled air end of the fluid compressor system and injecting a coolant to the working fluid.

14. The method of claim 13, further comprising separating the coolant injected into the working fluid and cooling the coolant in a cooler prior to recirculation.

15. The method of claim 14, further comprising selectably directing the coolant from a coolant separator tank to the at least one evaporator.

16. The method of claim 15, further comprising evaporating the waste heat recovery fluid in the at least one evaporator with excess heat from the coolant.

17. The method of claim of claim 11, further comprising directing the working fluid through a coolant-free compressor, wherein the working fluid passes through a first compressor stage, an intercooler, a second compressor stage, and an aftercooler.

18. The method of claim 17, further comprising directing the organic fluid through a first evaporator and a second evaporator.

19. The method of claim 18, further comprising pre-cooling the working fluid in the first evaporator prior to directing the working fluid through the intercooler.

20. The method of claim 18, further comprising pre-cooling the working fluid in the second evaporator prior to directing the working fluid through the aftercooler.

* * * * *